United States Patent [19]

Sziklas et al.

[11] Patent Number: 4,841,541
[45] Date of Patent: Jun. 20, 1989

[54] COUPLING OF RING LASERS

[75] Inventors: Edward A. Sziklas, Glastonbury; John A. Benda, Amston, both of Conn.

[73] Assignee: United Technologies Corporation, Hartford, Conn.

[21] Appl. No.: 221,857

[22] Filed: Jul. 20, 1988

[51] Int. Cl.⁴ ............................................. H01S 3/083
[52] U.S. Cl. ........................................ 372/94; 372/95; 372/97; 372/108
[58] Field of Search ................... 372/94, 95, 97, 108, 372/55, 93, 92

[56] References Cited

U.S. PATENT DOCUMENTS

| H99 | 8/1886 | Jones et al. | 372/95 |
| 4,164,366 | 8/1979 | Sziklas et al. | 372/95 |
| 4,170,405 | 10/1979 | Sziklas | 372/95 |
| 4,682,339 | 7/1987 | Sziklas et al. | 372/95 |

Primary Examiner—Leon Scott, Jr.
Attorney, Agent, or Firm—Eric W. Petraske

[57] ABSTRACT

An improved ring laser system having mutual coupling between two or more ring laser resonators employs a two-step coupling process, in which coupling power is coupled into the adjoint forward mode of an adjacent resonator, from which it diffractively couples to the forward mode. A portion of forward-mode power is coupled into the adjoint reverse mode from which it diffractively couples to the reverse mode within each resonator. A portion of this reverse mode power is used to coupled into other resonators. A complementary configuration employs forward-mode radiation as the coupling radiation.

12 Claims, 2 Drawing Sheets

COUPLING OF RING LASERS

DESCRIPTION

1. Technical Field

The field of the invention is that of laser resonator arrays, in particular, arrays of mutually coupled resonators, each having a ring configuration.

2. Background Art

U.S. Pat. No. 4,682,339 illustrates an array of mutually coupled laser resonators in which the individual resonators have the conventional standing wave confocal configuration. The coupling is accomplished by coupling a portion of the output beam of a resonator into an adjacent resonator. The coupled beam travels along the same path as the output beam of the adjacent resonator but in the opposite direction. The coupled beam, if it has sufficient power, will dominate the radiation in the host resonator and convert it to the same frequency and phase as the source resonator.

When such an arrangement is applied to ring resonators, two difficulties are encountered. If the ring lasers are operated in normal fashion with the reverse wave suppressed in each, two one-way coupling paths are required to achieve the same coupling efficiency as one two-way path linking standing-wave lasers. This doubling of coupling paths translates into added cost and complexity. If the reverse waves are not suppressed, the coupling techniques described in U.S. Pat. No. 4,682,339 should be applicable without the need for additional coupling paths. However, initial tests of coupled ring lasers, operating without reverse-wave suppressors, failed to demonstrate stable phase-locked operation.

DISCLOSURE OF INVENTION

The invention relates to an array of mutually coupled ring resonators, in which stable phased-locked operation is achieved by coupling optical energy from a forward mode in one laser to a reverse mode in an adjacent laser through an intermediate mode, adjoint to the reverse mode of the second laser.

A feature of the invention is the addition of an optical means that converts energy between forward and reverse modes within a given laser.

Other features and advantages will be apparent from the specification and claims and from the accompanying drawings which illustrate an embodiment of the invention.

BEST MODE FOR CARRYING OUT THE INVENTION

Figure 1:
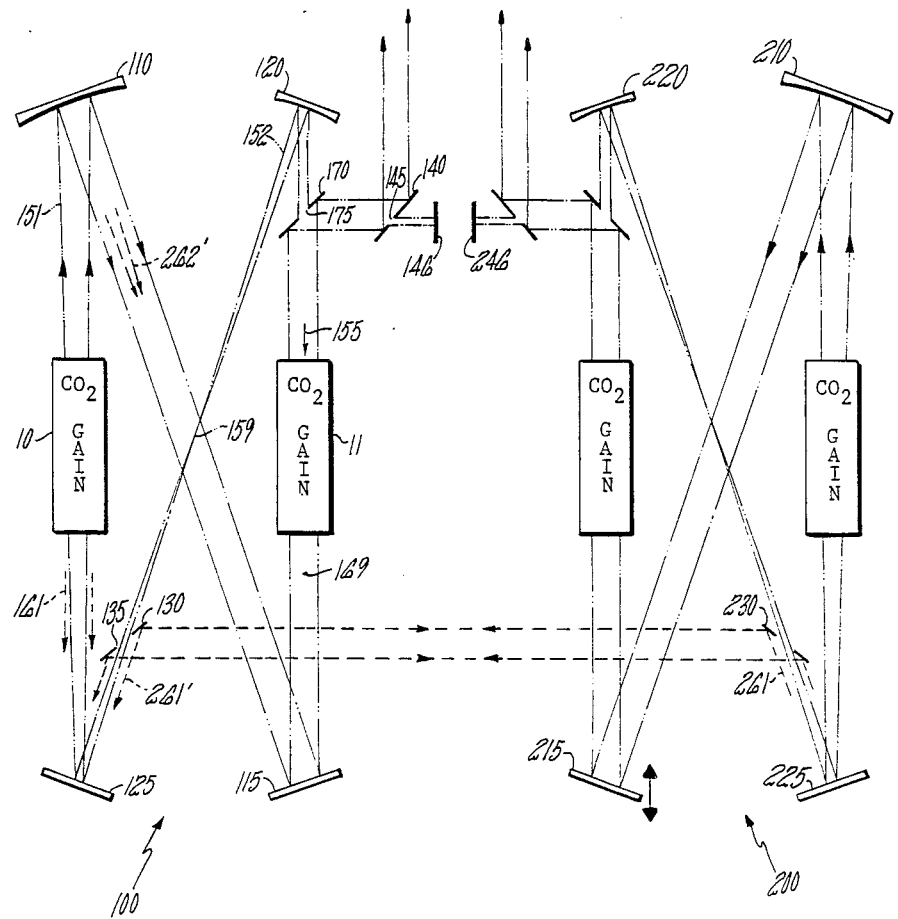
FIG. 1 illustrates in partially schematic, partially pictorial form one embodiment of the invention.

Referring now to FIG. 1, there is shown a pair of ring laser resonators in which a left resonator, denoted generally by the numeral 100, generates radiation in two conventional modes, the forward mode and the reverse mode. The forward mode is indicated by the solid lines in the drawing and is collimated between a first curved mirror 110 in the upper left corner and a second curved mirror 120 in the upper right hand corner. Two flat mirrors, 115 and 125, complete the basic set of mirrors. In operation, collimated radiation denoted in the collimated portion by the numeral 151 passes from mirror 110 to mirror 115 and then upwardly to mirror 120. A portion of the outer area of beam 151 is deflected by conventional scraper mirror 170 having aperture 175. This output portion is deflected by turning mirror 140 having a coupling aperture 145 that will be described later.

A portion of the collimated beam travels upwardly toward mirror 120, from which it is focused downwardly and to the left as beam 152. The numeral 152 will be used for the forward beam in both its diverging and converging forms. Beam 152 passes through a focal point 159 and then diverges, being reflected off flat mirror 125 and then back upwardly to focusing mirror 110. As it passes through gain cells 10 and 11, it is amplified.

For simplicity in the drawing, only portions of the reverse wave are illustrated. In the lower left of the drawing, two dotted arrows, denoted by the numeral 161, refer to the collimated portion of the reverse beam. This beam 161 is reflected off mirror 125, passes upwardly to curved mirror 120, passing through coupling mirror 130 and aperture 135, the operation of which will be described later. The reverse wave then travels downwardly, converging through aperture 175 to a focal point 169 on the right hand leg of resonator 100. It then diverges, being reflected off turning mirror 115 to mirror 110, at which it is collimated and travels again downwardly down the left hand edge of the resonator.

These are the two basic modes of the ring laser resonator. In this particular resonator, the dimensions and radii of curvature have been chosen such that the two mirrors are confocal and the length of the path between the mirrors 110 and 120 is equal in the converging-diverging leg to the length between the same mirrors when the beam is collimated. In this particular case, the forward wave is collimated in the region in which the reverse wave is converging/diverging and vice versa. This is a simple configuration that is experimentally advantageous, but the principle of the invention can readily be extended by those skilled in the art to more complex resonator configurations.

It is conventional in the ring resonator art to maintain a power imbalance between the two modes of operation. In the case of high power ring resonators, it is necessary to keep the power of the reverse mode below some threshold in order to avoid damage to the system. This is effected by the two apertures 135 and 175. In particular, aperture 135 is in the collimated portion of the reverse wave and sets a limit to the diameter of that beam. This mirror 130 serves not only to maintain the power in the reverse wave as desired, but also uses the deflected power advantageously by using that as the coupling power into one or more other resonators.

If the directional arrows of the forward and reverse modes are reversed in FIG. 1, two additional modes would be depicted. These oppositely propagating modes demagnify in size on each round-trip passage through the resonator. (In contrast, the illustrated forward and reverse modes are magnified on each round-trip bounce.) When diffraction is taken into account, the oppositely propagating (demagnifying) forward-/reverse modes convert naturally, after a sufficient number of bounces, into the reverse/forward (magnifying) modes.

In the terminology of the above-mentioned U.S. patent, the oppositely propagating forward mode is called the adjoint of the reverse mode, and the oppositely propagating reverse mode is called the adjoint of the forward mode. Thus, adjoint reverse-to-forward coupling (depicted in FIG. 1) refers to the injection of a portion of the reverse mode existing in one ring resonator, into the oppositely propagating reverse mode (or adjoint forward mode) of an adjacent resonator.

Laser resonator 200 has a similar configuration to resonator 100, being the mirror image in this drawing. There is one difference in that mirror 215 is manually adjustable in order to correct the path length of resonator 200 to match that of resonator 100 within some reasonable tolerance. Without some degree of tuning phase-lock is not observed. In a more complex system, a closed-loop control system would be implemented to seek and maintain phase lock automatically.

Coupling between resonators is effected in this figure by tapping off a portion of reverse beam 161 by mirror 130 and directing it horizontally, as indicated by the dotted lines. Symmetrically, a portion of reverse beam 261 in resonator 200 is deflected by mirror 230 and travels to the left along the same dotted lines. Elements in resonator 200 are indicated by numerals increased by 100 from corresponding elements in resonator 100. The input beam from resonator 200 strikes mirror 130 and is deflected downwardly and to the left as a collimated beam. It is referred to when in resonator 100 as beam 261'. This beam has the same collimated-converging configuration as reverse beam 161, but it is traveling in the opposite direction and is therefore the adjoint of forward beam 151.

The path of beam 261' is downwardly to mirror 125 then upwardly along the left edge of the resonator to mirror 110, still collimated, from which it is focused downwardly as shown in the dotted lines labeled 262'. Beam 262' is deflected by turning mirror 115 upwardly towards focal point 169 on the right leg. Since beam 261' is demagnified in its round-trip propagation through the resonator, it travels easily through aperture 175, is deflected by mirror 120 and again through aperture 135. It travels around the ring, becoming smaller with each pass and converging towards the axis. At the same time, diffractive expansion occurs and beam 261' couples into forward beam 151, which is traveling in the same direction.

The portion of the coupled beam carrying the phase of the coupled radiation from resonator 200 starts at the axis and expands with the mode of beam 151, controlling the phase of beam 151 as it does so. It is through this mechanism that the phase "information" is transferred from resonator 200 to resonator 100. Symmetrically, of course, a similar transformation has taken place from resonator 100 to resonator 200.

A portion of the expanding beam 151 is deflected by its output mirror 170 and passes through aperture 145 to the forward wave suppressing mirror 146. It is deflected back along the direction from which it came. It reflects off mirror 170 and travels downwardly on the right side of resonator 100, as indicated by the arrow labeled 155. This sub-beam 155 is the forward beam traveling backwards (the adjoint of the reverse beam) and is therefore contracting towards the axis. It passes around the ring in the opposite sense of beam 151, being demagnified on each pass. As it contracts towards the axis, the same phenomenon of diffractive expansion occurs and beam 155 couples into the reverse beam 161. Thus, the phase information from resonator 200 is coupled into beam 151 and through the means of the forward wave suppressing mirror energy is coupled into reverse wave 161. The coupling is not directly from beam 261' to reverse wave 161, even though they are both reverse waves. Reverse wave 161, now also locked in phase to beam 151, is coupled out by mirror 130 and back to resonator 200, thus, "completing the loop" and transmitting the phase information symmetrically and mutually between the two resonators. A similar process is simultaneously taking place within resonator 200.

If the forward wave suppressing mirrors 146 and 246 were not present, the system would not exhibit stable phase-locked operation because, without an ample source of energy for the reverse mode, the coupling mirrors 130 and 230 would exhaust the available supply, leaving insufficient reverse-mode energy for coupling between lasers. (Normally, random scattering sites provide the only source of energy for the reverse mode.) Thus, the function of the mirrors 146 and 246 is to convert a portion of the forward mode into the reverse mode so as to provide adequate energy for coupling. The absence of these mirrors was responsible for the failure of early experiments on reverse-wave coupling of ring resonators.

As was mentioned above, it is conventional in the art to suppress as completely as possible the reverse wave in single ring laser operation. With the prescribed mode of operation for coupled rings it is desirable and even essential to allow some level of energy to exist in the reverse mode. Those skilled in the art will appreciate that the ratio of energy between forward and reverse modes is governed by the ratio of the degree of coupling provided by the pair of mirrors 130 and 140, and that, by selection of hole sizes in these mirrors, one can select an energy ratio which gives a broad locking range without adversely affecting individual ring laser performance. The ratio of power in the reverse to forward beams in the embodiment of FIG. 1 was approximately one to four.

Figure 2:
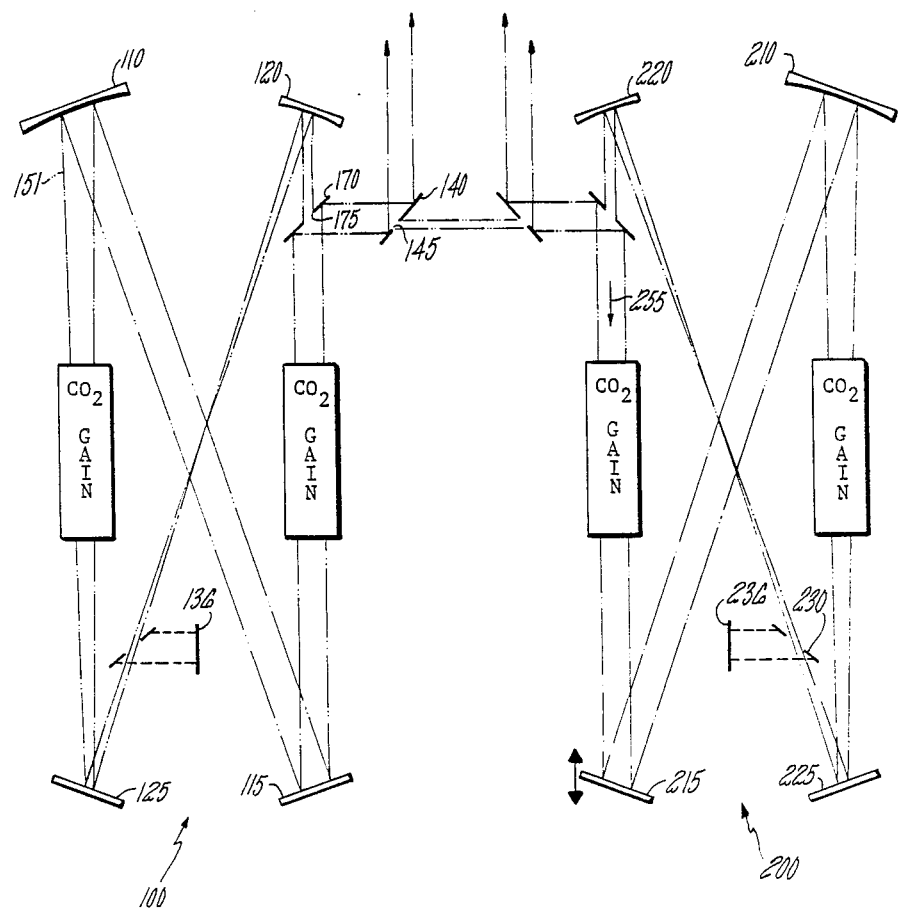
FIG. 2 illustrates in partially schematic, partially pictorial form another embodiment of the invention.

Referring now to FIG. 2, there is shown another embodiment of the invention in which the role of the forward and reverse waves is inverted from that shown in FIG. 1. Here, the forward wave suppressing mirrors 146 and 246 have been eliminated to allow direct coupling of the forward wave from each laser into the adjoint reverse wave of the other laser. The reverse wave suppressing mirrors 136 and 236 must now be added to convert excess energy in the reverse wave into forward-wave energy within each laser. The operation in this mode is analogous to that of the preceding one. Coupling is provided from the output beam 151 into he adjoint reverse beam 255 of resonator 200. Beam 255 contracts towards the axis as it passes around the ring, coupling to the reverse mode. A portion of the reverse mode is deflected out by scraper mirror 230 and coupled into the adjoint forward mode of resonator 200. The same sequence of coupling into the opposite of one mode; contracting toward the axis; dominating the other mode; recoupling and contracting towards the axis a second time; and then expanding to dominate the first mode is repeated in this case.

This invention has an important benefit, in that it is calculated that the coupling power required to achieve a fixed locking range is less for ring resonators than for standing-wave resonators by a factor as large as ten. Since it has also been found that good beam quality is more easily attained in the weak-coupling case, where the mode-control properties of the parent (uncoupled)

resonator are retained, this invention offers the potential of improved coupled laser performance.

It should be understood that the invention is not limited to the particular embodiments shown and described herein, but that various changes and modifications may be made without departing from the spirit and scope of this novel concept as defined by the following claims. For example, it is clear that this invention is applicable not just to two coupled ring lasers, but to an array of lasers containing an arbitrary number of ring resonators. Those skilled in the art will readily be able to design other resonator configurations in which power is tapped off at different locations than those illustrated in the figures, that may be more convenient for some particular application. In more complex resonator configurations, it may be desirable to tap off a coupling beam and manipulate it by a lens or other means to produce a beam that will match the adjoint mode of another resonator.

We claim:

1. A laser system comprising:
a first ring laser resonator having a first gain medium means for establishing an inverted population state in a first gain medium;
a first set of mirrors in a ring configuration for resonating, in predetermined radially diverging forward and reverse modes and predetermined radially converging adjoint reverse and adjoint forward modes, radiation in a first ring path passing through said gain medium, said radiation in said forward and adjoint forward modes travelling in a predetermined forward direction about said ring path and said radiation in said reverse and adjoint reverse modes travelling about said first ring path in a reverse direction opposite to said forward direction, said adjoint forward mode being adjoint to said forward mode and said adjoint reverse mode being adjoint to said reverse mode;
first outcoupling means for extracting radiation travelling in said forward mode in said first ring path from said first ring path;
internal coupling means for coupling a predetermined coupling fraction of said radiation in one of said forward and reverse modes into a first predetermined radially converging mode adjoint to the other of said forward and reverse modes and travelling about said first ring path in a direction opposite to that of said one of said forward and reverse modes, whereby said radiation in said first predetermined radially converging mode converges radially and couples into said other of said forward and reverse modes; and
means for coupling into said ring path a second predetermined amount of external coupling radiation into a predetermined radially converging mode adjoint to said one of said forward and reverse modes, whereby said external coupling radiation converges radially and couples in phase said one of said forward and reverse modes and said one of said forward and reverse modes phase couples through said internal coupling means said other of said forward and reverse modes, so that all of said predetermined modes of said ring laser resonator are coupled in phase to said external coupling radiation.

2. A laser system according to claim 1, in which said means for coupling into said ring path a predetermined amount of external coupling radiation into a predetermined radially converging mode adjoint to said one of said forward and reverse modes includes a master oscillator.

3. A laser system according to claim 2, in which said master oscillator couples a predetermined amount of external coupling radiation into a predetermined radially converging mode adjoint to said one of said forward and reverse modes into at least two ring resonators.

4. A laser system according to claim 1, in which said means for coupling into said ring path a predetermined amount of external coupling radiation into a predetermined radially converging mode adjoint to said one of said forward and reverse modes includes a second ring resonator.

5. A laser system according to claim 4, in which said internal coupling means suppresses radiation in said forward mode by coupling said predetermined fraction of said forward mode to said adjoint reverse mode and said means for coupling into said ring path a predetermined amount of external radiation includes means for coupling out a predetermined amount of radiation into a reverse mode of said second ring resonator, said second ring resonator having a reverse mode matched to said reverse mode of said first ring laser resonator; and
said first ring laser resonator includes means for coupling a predetermined coupling fraction of radiation in said reverse mode into said second ring laser resonator, whereby said first and second ring laser resonators are mutually coupled.

6. A laser system according to claim 5, in which said internal coupling means suppresses radiation in said forward mode by coupling said predetermined fraction of said forward mode to said adjoint reverse mode and said means for coupling into said ring path a predetermined amount of external radiation includes means for coupling out a predetermined amount of radiation into a reverse mode of at least two ring resonators, each of said at least two ring resonators having a reverse mode matched to said reverse mode of said first ring laser resonator; and
said first ring laser resonator includes means for coupling a predetermined coupling fraction of radiation in said reverse mode into said at least two ring laser resonators, whereby said first and said at least two ring laser resonators are mutually coupled.

7. A laser system according to claim 5, in which said means for coupling into said ring path a predetermined amount of external radiation and said means for coupling a predetermined coupling fraction of radiation in said reverse mode into said second ring laser resonator share a common mirror in said ring path.

8. A laser system according to claim 4, in which said internal coupling means suppresses radiation in said reverse mode by coupling a predetermined fraction of said reverse mode to said adjoint forward mode and said means for coupling into said ring path a predetermined amount of external radiation include means for coupling out a predetermined amount of radiation into a forward wave of said second ring resonator, said second ring resonator having a forward mode matched to said forward mode of said first ring laser resonator; and
said first ring laser resonator includes means for coupling a predetermined coupling fraction of radiation in said forward mode into said second ring laser resonator, whereby said first and second ring laser resonators are mutually coupled.

9. A laser system according to claim 8, in which said means for coupling into said ring path a predetermined amount of external radiation and said means for coupling a predetermined coupling fraction of radiation in said forward mode into said second ring laser resonator share a common mirror in said ring path.

10. A laser system according to claim 4, in which said means for coupling into said ring path a predetermined amount of external coupling radiation into a predetermined radially converging mode adjoint to said one of said forward and reverse modes includes at least two ring resonators and means for combining coupling radiation therefrom.

11. A laser system comprising:
a first ring laser resonator having a first gain medium means for establishing an inverted population state in said first gain medium;
a first set of mirrors in a ring configuration for resonating, in a predetermined radially diverging forward mode, radiation in a first ring path passing through said gain medium, said radiation in said forward mode travelling in a predetermined forward direction about said ring path and also for resonating, in a predetermined radially diverging reverse mode, radiation travelling about said first ring path in a reverse direction opposite to said forward direction;
first outcoupling means for extracting radiation travelling in said forward mode in said first ring path from said first ring path;
external coupling means for coupling radiation in said reverse mode out from said first ring path and for coupling external coupled radiation into said first ring path into a predetermined, radially converging adjoint forward mode travelling in said forward direction about said ring path, whereby said external coupled radiation converges radially and couples into said predetermined radially diverging forward mode travelling about said first ring path in said forward direction; and
internal coupling means for coupling a predetermined forward coupling fraction of said radiation in said forward mode into a predetermined radially converging adjoint reverse mode travelling about said first ring path in said reverse direction, whereby said radiation in said adjoint reverse mode converges radially and couples into said predetermined radially diverging reverse mode travelling about said first ring path in said reverse direction, so that said external coupled radiation controls all of said adjoint forward, forward, adjoint reverse and reverse modes through sequential coupling.

12. A laser system comprising:
a first ring laser resonator having a first gain medium means for establishing an inverted population state in a first gain medium;
a first set of mirrors in a ring configuration for resonating, in a predetermined radially diverging forward mode, radiation in a first ring path passing through said gain medium, said radiation in said forward mode travelling in a predetermined forward direction about said ring path and also for resonating, in a predetermined radially diverging reverse mode, radiation travelling about said first ring path in a reverse direction opposite to said forward direction;
first outcoupling means for extracting radiation travelling in said forward mode in said first ring path from said first ring path;
external coupling means for coupling radiation in said forward mode out from said first ring path and for coupling external coupled radiation into said first ring path in a predetermined, radially converging adjoint reverse mode travelling in said reverse direction about said ring path, whereby said coupled radiation converges radially and couples into said predetermined radially diverging reverse mode travelling about said first ring path in said reverse direction; and
internal coupling means for coupling a predetermined reverse coupling fraction of said radiation in said reverse mode into a predetermined radially converging adjoint forward mode travelling about said first ring path in said forward direction, whereby said radiation in said adjoint forward mode converges radially and couples into said predetermined radially diverging forward mode travelling about said first ring path in said forward direction, whereby said external coupled radiation controls all of said adjoint reverse, reverse, adjoint forward and forward modes through sequential coupling.

* * * * *